(12) United States Patent
Wolff et al.

(10) Patent No.: US 6,521,713 B2
(45) Date of Patent: Feb. 18, 2003

(54) VULCANIZABLE EPDM CONTAINING RUBBER COMPOSITION

(75) Inventors: Siegfried Wolff, Bornheim-Merten (DE); Rainer Panenka, Bruehl (DE); Marinus Haddeman, Bergisch-Gladbach (DE); Hidenari Nakahama, Ichihara (JP)

(73) Assignees: Degussa AG, Düsseldorf (DE); Mitsui Petrochemical Industries, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/417,858

(22) Filed: Apr. 7, 1995

(65) Prior Publication Data

US 2002/0061979 A1 May 23, 2002

Related U.S. Application Data

(63) Continuation-in-part of application No. 08/272,644, filed on Jul. 11, 1994, now abandoned, and a continuation-in-part of application No. 07/990,770, filed on Dec. 15, 1992, now abandoned.

(30) Foreign Application Priority Data

Dec. 19, 1991 (DE) .......................................... 41 41 975

(51) Int. Cl.$^7$ .................................................. C08F 8/34
(52) U.S. Cl. .................................... 525/331.8; 525/342
(58) Field of Search .......................... 525/330.8, 330.9, 525/331.8, 329.3

(56) References Cited

U.S. PATENT DOCUMENTS

| | | | | | |
|---|---|---|---|---|---|
| 3,577,393 | A | * | 5/1971 | Schrage | 526/339 |
| 3,674,755 | A | * | 7/1972 | Yamamoto | 526/339 |
| 3,684,782 | A | * | 8/1972 | Longi | 526/339 |
| 3,873,489 | A | | 3/1975 | Thurn et al. | |
| 4,003,843 | A | * | 1/1977 | Kempermann | 525/342 |

* cited by examiner

Primary Examiner—Christopher Henderson
(74) Attorney, Agent, or Firm—Smith, Gambrell & Russell, LLP

(57) ABSTRACT

A rubber composition is disclosed containing an ethylene-propylene-nonconjugated diene copolymer rubber (or a blend of an ethylene-propylene-nonconjugated diene copolymer rubber and a diene rubber), a specific alkoxysilane compound, and amorphous silica powder having a specific surface area of 50 to 100 m$^2$/g (BET adsorption). The vulcanized rubber is prepared by vulcanizing such a rubber composition. The rubber composition is excellent in dynamic characteristics and also in mechanical characteristics, dynamic fatigue resistance and thermal aging resistance. It also can provide a vulcanized rubber having the above-mentioned effects.

2 Claims, No Drawings

VULCANIZABLE EPDM CONTAINING RUBBER COMPOSITION

REFERENCE TO A RELATED APPLICATION

This is a continuation-in-part of abandoned U.S. patent application Ser. No. 07/990,770 filed Dec. 15, 1992 and abandoned U.S. patent application Ser. No. 08/272,644 filed Jul. 11, 1994, which are relied on and incorporated herein by reference in their entirety.

INTRODUCTION AND BACKGROUND

The present invention relates to a vulcanizable rubber composition containing an ethylene-propylene-nonconjugated diene copolymer rubber (EPDM) excellent in thermal resistance, fatigue resistance, and also in dynamic characteristics, low in tan δ value and suitable for applications such as automobile tires and vibration-proof rubber. The present invention also relates to a vulcanized rubber prepared by vulcanizing the above-described rubber composition.

Diene rubbers such as natural rubber (NR), styrene-butadiene rubber (SBR), and butadiene rubber (BR) are known as rubbers excellent in dynamic fatigue resistance and dynamic characteristics, and have been used as raw materials for automobile tires and vibration-proof rubber. However, the environment for the application of these rubber products has been largely changed recently to require improvements in thermal resistance and weather resistance of rubber products.

In automobile tires, tread and tire side walls especially require weather resistance. However, no rubber has been available which maintains the excellent fatigue resistance and dynamic characteristics of the existing diene rubber as well as having good weather resistance.

Thus various blended rubber compositions of diene rubber (which is excellent in dynamic fatigue resistance and dynamic characteristics) with EPT ((EPDM) which is excellent in thermal resistance and weather resistance) have been investigated. However, since the level of the dynamic characteristics of EPT is different from that of diene rubber, no blended rubber composition showing uniform properties could be prepared so far.

The dynamic characteristics of automobile tires are evaluated on the basis of whether the material increases fuel cost or not and its index tan δ (loss tangent) value. The lower the tanδ value, the better are the dynamic characteristics.

On the other hand, in the vibration-proof rubber products for automobiles, the existing vibration-proof rubber products based on natural rubber (which is a diene rubber) cannot provide sufficient fatigue resistance capable of withstanding practical use with the range of temperature increases in the engine compartment.

Therefore, there is a strong desire for a new rubber material having excellent thermal resistance, as well as dynamic characteristics and fatigue resistance, equal to or higher than those of diene rubber. Generally, in order to improve fatigue resistance, the rubber material is required to have a force relaxing mechanism. For this purpose, it is required to have the crosslinked form of the polysulfur bond in the rubber rather than a monosulfur bond. A proper crosslinking density is also required.

On the other hand, it is required to increase crosslinking density in order to improve dynamic characteristics. However, attempts to bring the dynamic characteristics of EPT in conformity with those of a diene rubber such as NR has resulted in too high a crosslinking density with the resultant deterioration of fatigue resistance; it was impossible to make dynamic characteristics compatible with fatigue resistance.

The dynamic characteristics in the vibration-proof rubber are evaluated on the basis of whether it has a low dynamic magnification. Since the dynamic magnification is approximately proportional to the tan δ value, tan δ can be used as its index.

The present invention discloses that the dynamic characteristics and the fatigue resistance, which are in opposite relation with respect to each other, can be unexpectedly improved at the same time by using (1) an ethylene-propylene-nonconjugated diene copolymer rubber (which is excellent in thermal resistance), (2) a specific alkoxysilane compound, and (3) a specific amorphous silica powder, to enhance the interaction between the amorphous silica powder and the polymer, that is, the ethylene-propylene-nonconjugated diene copolymer rubber through the alkoxysilane compound.

SUMMARY OF THE INVENTION

One object of the present invention is to solve the above-mentioned problems accompanying the conventional technology and to provide a rubber composition which has fatigue resistance and dynamic characteristics equal to those of a diene rubber (such as natural rubber) and which is also excellent in thermal resistance and weather resistance.

Another object of the present invention is to provide a vulcanized rubber comprising the above-mentioned rubber composition.

The vulcanizable rubber composition according to the present invention is characterized in that it contains an ethylene-propylene-nonconjugated diene copolymer rubber (EPDM), a crosslinking system as commonly used as well as at least one of the alkoxysilane compounds expressed by the following general formula (I) or (II), and silica and/or silicate powder having a specific surface area of 50 to 100 m²/g (BET adsorption: ISO 5794/1, Annex D).

The alkoxysilane has the general formula I:

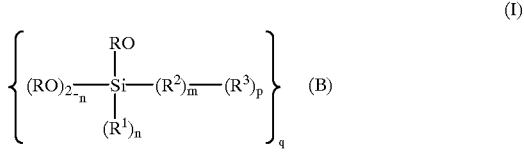

where R is an alkyl group having 1 to 4 carbon atoms or an alkoxy group having 1 to 4 carbon atoms; $R^1$ is an alkyl group having 1 to 4 carbon atoms or phenyl groups; n is 0, 1 or 2; $R^2$ is a divalent straight-chained or branched hydrocarbon radical (alkylene) having 1 to 6 carbon atoms; $R^3$ is an arylene group having 6 to 12 carbon atoms; m and p are respectively 0 or 1 but not 0 at the same time; q is 1 or 2; and B is —SCN or —SH when q is 1 and —Sx— (where x is an integer of 2 to 8) when q is 2.

Alternatively, the alkoxysilane has the general formula

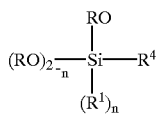

(II)

where R is an alkyl group having 1 to 4 carbon atoms or an alkoxy group having 1 to 4 carbon atoms; $R^1$ is an alkyl group having 1 to 4 carbon atoms or phenyl group; n is 0, 1 or 2; and $R^4$ is a monovalent straight-chained or branched unsaturated hydrocarbon radical having 2 to 20 carbon atoms.

In the rubber composition according to the present invention, an ethylene-propylene-5-ethylidene-2-norbornene copolymer rubber having a Mooney viscosity ($MS_{1+4}$, 160° C.) of 40 to 80 is preferred as the above-mentioned ethylene-propylene-nonconjugated diene copolymer rubber.

The vulcanized rubber according to the present invention is characterized in that it is prepared by vulcanizing the rubber composition described above.

The rubber composition according to the present invention, and the vulcanized rubber prepared from the rubber composition, unexpectedly have fatigue resistances and dynamic characteristics equal to those of diene rubber (such as NR) and also are excellent in thermal resistances and weather resistances.

DETAILED DESCRIPTION OF THE INVENTION

The rubber composition according to the present invention, and the vulcanized rubber prepared from the rubber composition, will be illustrated as follows:

First, the rubber composition according to the present invention will be described. The rubber composition according to the present invention contains (1) an ethylene-propylene-nonconjugated diene copolymer rubber, (2) a specific alkoxysilane compound, and (3) a specific amorphous silica and/or silicate powder.

Ethylene-Propylene-Nonconjugated Diene Copolymer Rubber

The ethylene-propylene-nonconjugated diene copolymer rubber used in the present invention contains usually 50 to 83 mol % (preferably 50 to 73 mol %) of ethylene and usually 50 to 17 mol % (preferably 50 to 27 mol %) of propylene.

The above-mentioned nonconjugated dienes include, for example, (a) chain nonconjugated dienes such as 1,4-hexadiene; 1,6-octadiene; 2-methyl-1,5-hexadiene; 6-methyl-1,5-heptadiene; and 7-methyl-1,6-octadiene; (b) cyclic nonconjugated dienes such as cyclohexadiene; dicyclopentadiene; methyltetrahydroindene; 5-vinylnorbornene; 5-ethylidene-2-norbornene; 5-methylene-2-norbornene; 5-isopropylidene-2-norbornene; and 6-chlormethyl-5-isopropenyl-2-norbornene; and (c) trienes such as 2,3-diisopropylidene-5-norbornene; 2-ethylidene-3-isopropylidene-5-norbornene; 2-propenyl-2,2-norbornadiene; 1,3,7-octatriene; and 1,4,9-decatriene. Among them, preferably used are 1,4-hexadiene and cyclic nonconjugated dienes, particularly 5-ethylidene-2-norbornene. When 5-ethylidene-2-norbornene is used as the nonconjugated diene in the present invention, a rubber composition and a vulcanized rubber most excellent in fatigue resistance can be obtained.

The ethylene-propylene-nonconjugated diene copolymer rubber used in the present invention has a iodine number, an index for the nonconjugated diene content, of usually 8 to 30, preferably 8 to 25.

The ethylene-propylene-nonconjugated diene copolymer rubber used in the present invention has a Mooney viscosity ($MS_{1+4}$, 160° C.) of usually 40 to 80, preferably 50 to 80. When an ethylene-propylene-nonconjugated diene copolymer rubber having a Mooney viscosity ($MS_{1+4}$, 160° C.) falling within the above-mentioned range is used in the present invention, a rubber composition and a vulcanized rubber unexpectedly showing fatigue resistances equal to or higher than those of a diene rubber such as natural rubber can be prepared.

An ethylene-propylene-nonconjugated diene copolymer rubber having a Mooney viscosity ($MS_{1+4}$, 100° C.) of 60 to 200 can also be used in the claimed compositions.

Although the above-mentioned ethylene-propylene-nonconjugated diene copolymer rubber can be used alone as the rubber component, a blend of the above-mentioned copolymer rubber with a diene rubber can also be used. Such diene rubbers include, for example, natural rubber (NR), isopropylene rubber (IR), butadiene rubber (BR), styrene-butadiene rubber (SBR), acrylonitrile-butadiene rubber (NBR), and chloroprene rubber (CR). Among them, natural rubber and isoprene rubber are preferred. The above-mentioned diene rubbers are used either alone or in combination. The diene rubber is usually used in the present invention in an amount of 20 to 50 parts by weight based per 100 parts by weight of the total amount of the ethylene-propylene diene copolymer rubber.

Alkoxysilane Compound

The alkoxysilane compound used in the present invention is expressed by the general formula (I) or (II) and plays a part as a silane coupling agent. The alkoxysilane has the general formula I:

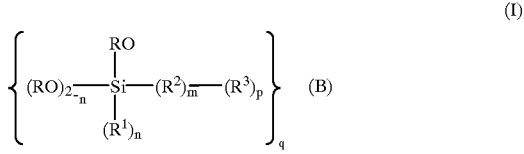

(I)

where R is an alkyl group having 1 to 4 carbon atoms or an alkoxy group having 1 to 4 carbon atoms; $R^1$ is an alkyl group having 1 to 4 carbon atoms or phenyl group; n is 0, 1 or 2; $R^2$ is a divalent straight-chained or branched hydrocarbon radical having 1 to 6 carbon atoms; $R^3$ is an arylene group having 6 to 12 carbon atoms; m and p are respectively 0 or 1 but not 0 at the same time; q is 1 or 2; and B is —SCN or —SH when q is 1 and —$S_x$— (where x is an integer of 2 to 8) when q is 2.

Alternatively, the alkoxysilane has the general formula II:

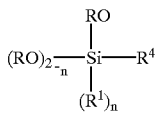

(II)

where R, $R^1$, and n have the same meanings as defined in the above general formula (I) and $R^4$ is a monovalent straight chained or branched, unsaturated hydrocarbon radical having 2 to 20 carbon atoms.

Among the alkoxysilane compounds expressed by the above-mentioned general formula (I), trialkoxysilane compounds as shown below in which B in the general formula (I) is —$S_4$— are used preferably:
(1) Bis-3-(trimethoxysilyl)propyl-tetrasulfane
   $(H_3CO)_3$ Si—$(CH_2)_3$—$S_4$—$(CH_2)_3$—Si—$(OCH_3)_3$
(2) Bis-3-(triethoxysilyl)propyl-tetrasulfane
   $(H_5C_2O)_3$Si—$(CH_2)_3$—S—$(CH_2)_3$—Si—$(OC_2H_5)_3$
(3) Bis-3-(tripropoxysilyl)propyl-tetrasulfane
   $(H_7C_3$ O $)_3$Si—$(CH_2)_3$—$S_4$—$(CH_2)_3$—Si—$(OC_3H_7)_3$
Among the above-mentioned compounds, particularly preferred is the above-mentioned (2), bis-3-(triethoxysilyl) propyl-tetrasulfane.

Among the alkoxysilane compounds expressed by the above-mentioned general formula (II), an alkoxysilane compound as shown below is preferably used:
(4) 3-Butene-triethoxysilane.

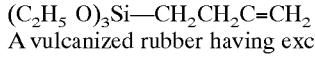

A vulcanized rubber having excellent dynamic characteristics can be prepared by using the alkoxysilane compound expressed by the general formula (I) or (II) as shown above.

In the present invention, the alkoxysilane compound is used in an amount that ensures that $0.1 \cdot 10^{-6}$ mol to 13.5·10–6 mol (preferably $0.3 \cdot 10^{-6}$ to $10.5 \cdot 10^{-6}$ mol) alkoxysilyl groups are available per square meter specific surface area of the amorphous silica. If the amount of alkoxysilyl groups becomes lower than $0.1 \times 10^{-6}$ mol per square meter surface area, the silica surface is modified to a too small extent giving to less filler/polymer crosslinks and too small effect on dynamic properties. If the amount of alkoxysilyl groups exceed $13.5 \cdot 10^{-6}$ mol per square meter specific surface area, the silane is in excess compared to the reactive silica surface and has only little effect on further improvement of the dynamic compound properties.

A rubber composition excellent in thermal resistance, fatigue resistance, and dynamic characteristics can be obtained by using the alkoxysilane compound in the proportional amounts as shown above.

Amorphous Silica Powder

The amorphous silica powder used in the present invention are precipitated and hydrophilic fine powdered silicic acid or fine powdered silicates and have a specific surface area of 50 to 100 $m^2/g$ (BET adsorption: ISO 5794/1, Annex D) preferably 60 to 90 $m^2/g$. In the present invention, the fine powdered silicic acid or the fine powdered silicates can be used either alone or in combination thereof.

In the present invention, the silica and/or silicates are used in a total amount of usually 5 to 90 parts by weight, preferably 20 to 80 parts by weight, based on 100 parts by weight of the rubber component.

When the rubber composition according to the present invention is used in a vibration-proof rubber product, there are required dynamic characteristics according to which vibration damping effect is exerted according to the application of the vibration-proof rubber product. Hence, the compounding proportions of the above-mentioned alkoxysilane compound and the amorphous silica powder are adjusted according to the purpose of the application.

Other Components

In the present invention, additives such as inorganic fillers other than the above-mentioned amorphous silica and silicates can be incorporated into the rubber composition within the limit not impairing the purpose of the present invention.

The inorganic fillers other than the above-mentioned amorphous silica powder include, for example, carbon blacks such as SRF, GPF, FEF, HAF, ISAF, SAF, FT and MT, fine powdered silicic acid, light calcium carbonate, heavy calcium carbonate, talc and clay. In the rubber composition according to the present invention, the total amount of the inorganic filler components is usually 10 to 120 parts by weight based on 100 parts by weight of the rubber components. A too high total amount of the inorganic filler components cannot give a rubber composition and a vulcanized rubber excellent in dynamic characteristics and fatigue resistance.

Preparation of a Vulcanized Rubber

Preparation of a vulcanized rubber from the rubber composition according to the present invention simply calls for preparation of unvulcanized compounded rubber (a rubber composition) once by the method mentioned below, and then molding of this compounded rubber to an intended shape, followed by vulcanization in the same manner as in vulcanizing a usual rubber. When the vulcanized rubber according to the present invention is prepared, the types and the amount added of the softening agent and also the types and the amount added of the compounds constituting the vulcanizing system (such as the vulcanizing agent, the vulcanization promotor, and the vulcanization aid), and the procedures for the preparation of the vulcanized rubber are properly selected, in addition to the above-mentioned rubber component, the alkoxysilane compound and the amorphous silica powder, in according with the intended application of the vulcanized rubber and the performance based on it.

A softening agent usually used in rubber can be used as the above-mentioned softening agent. Typically used are petroleum softening agents such as process oils, lubricating oils, paraffins, liquid paraffin, petroleum asphalt and vaseline; coal tar softeners such as coal tar and coal tar pitch; fatty oil softeners such as castor oil, linseed oil, rapeseed oil and coconut oil; tall oil or blends thereof in an amount of 0 to 60 parts by weight, preferably 2 to 40 parts by weight, based on 100 parts of rubber, as was well as waxes such as beeswax, carnauba wax and lanolin; fatty acids and fatty acid salts such as ricinolic acid, palmitic acid, barium stearate, calcium stearate and zinc laureate; and synthetic high polymers such as petroleum resin, atactic polypropylene and cumarone-indene resin. Among them, preferably used are the petroleum softeners, particularly process oils. Such agents and their amounts are well known in the art.

Sulfur compounds as shown below are used as the vulcanizing agents for the preparation of the vulcanized rubber according to the present invention. The sulfur compounds used include, for example, sulfur, sulfur chloride, sulfur dichloride, morpholine disulfide, an alkylphenol disulfide, tetramethyl-thiuram disulfide, and selenium dimethyldithiocarbamate. Among them, sulfur is preferably used. The above-mentioned sulfur compound is used in a proportion of 0.1 to 4 parts by weight, preferably 0.5 to 3 parts by weight, based on 100 parts by weight of the ethylene-propylene-nonconjugated diene copolymer rubber. All such substances are well known in the art.

It is preferred to use a vulcanization accelerator in combination when a sulfur compound is used as the vulcanizing agent in the preparation of a vulcanized rubber according to the present invention. Among the well known vulcanization accelerators useful for the invention are, for example, (a) thiazol compounds such as N-cyclohexyl-2-benzothiazol-sulfenamide; N-oxydiethylene-2-benzothiazol-sulfenamide; N,N-diisopropyl-2-benzothiazol-sulfenamide; 2-mercaptobenzothiazol; 2-(2,4-dinitrophenyl) mercaptobenzothiazol; 2-(2,6-diethyl-4-morpholinothio) benzothiazol and dibenzothiazyldisulfide; (b) guanidine compounds such as diphenylguanidine, triphenylguanidine, diorthotolyl-guanidine, orthotolyl biguanide and diphenylguanidine phthalate; (c) aldehyde-amine or aldehyde-ammonia compounds such as acetaldehyde-aniline reaction product, butyladehyde-aniline condensate, hexamethylene tetramine and acetaldehyde-ammonia reaction product; (d) imidazolin compounds such as 2-mercapto-imidazolin; (e) thiourea compounds such as thiocarbanilide, diethylthiourea, dibutylthiourea, trimethylthiourea and diorthotolylthiourea; (f) thiuram compounds such as tetramethylthiuram monosulfide, tetramethylthiuram disulfide, tetraethylthiuram disulfide, tetrabutyl-thiuram disulfide and pentamethylene thiuram tetra-sulfide; (g) dithioate compounds such as zinc dimethyldithiocarbamate, zinc diethyldithiocarbamate, zinc di-n-butyldithiocarbamate, zinc ethylphenyl dithiocarbamate, zinc butylphenyl-dithiocarbamate, sodium dimethyldithiocarbamate, selenium dimethyldithiocarbamate and tellurium diethyldithiocarbamate; (h) xanthate compounds such as zinc dibutylxanthate; and (i) compounds such as zinc white.

The above-mentioned vulcanization accelerators are used in a proportion of 1 to 20 parts by weight, preferably 0.5 to 10 parts by weight, based on 100 parts by weight of the ethylene-propylene-nonconjugated diene copolymer rubber.

Alkoxysilanes and silicas or silicates, respectively, are preferably mixed or reacted prior to incorporation into the claimed rubber compounds, as described in U.S. Pat. No. 4,076,550 (incorporated by reference in its entirety) or German P 40 04 781 (U.S. Pat. No. 5,116,886, incorporated by reference in its entirety). It is not necessary that the total amount of silica or silicate used be modified with the alkoxy silanes. It is also possible to modify only part of it and to use the rest without preliminary modification.

Carbon blacks used can be pre-mixed or chemically modified with organosilicone compounds; their preparation is described in German Patent Application 40 23 537. The compounded rubber before vulcanization is prepared by the method shown below.

Thus, the above-mentioned rubber component, the alkoxysilane compound and the amorphous silica powder and further a softening agent are milled in a mixer such as a Banburry mixer at a temperature of 80 to 150° C. for 3 to 10 minutes, and then a vulcanizing agent and, if required, a vulcanization accelerator or a vulcanization aid are added and mixed in a Banburry mixer or on a roll (such as an open roll) and milled at a roll temperature of 40 to 60° C. for 5 to 30 minutes, and then the milled product is extruded to prepare compounded rubber in ribbon or sheet form. The compounded rubber thus prepared is molded to an intended shape by an extruder, a calendar roll or a press and heated at a temperature of 100 to 270° C. for 1 to 150 minutes at the same time as the molding or after the molding is introduced in a vulcanizer to prepare vulcanized rubber. In performing such vulcanization, a mold may or may not be used. In case a mold is not used, the processes of molding and vulcanization are usually carried out continuously.

The rubber composition according to the present invention which consists of ethylene-propylene-nonconjugated diene copolymer rubber, an alkoxysilane compound, and amorphous silica powder is excellent not only in dynamic properties but also in mechanical properties, dynamic fatigue resistance and heat aging resistance, and can provide vulcanized rubber excellent in such properties. Since the vulcanized rubber obtained from the rubber composition according to the present invention is excellent in the above properties, it can be widely used as tires, automobile parts, general industrial parts, materials for civil engineering and building, and the like. In particular, it can be suitably used for uses in which dynamic fatigue resistance is required, e.g., tire treads, tire sidewalls, wiper blades, automobile engine mounts, etc.

The present inventon also concerns a rubber composition for engine mounts. Prior rubber compositions for engine mounts were made from natural rubber (NR) on account of its excellent elasticity with carbon black as reinforcing filler. Beside excellent elasticity, also required are excellent dynamic properties, low compression set and well balanced overall properties. Modern car design with improved aerodynamic properties leads to more encapsulated engines. Consequently, much higher temperatures occur in the engine area. High temperature leads to severe heat aging of NR-compounds and deterioration of the physical compound properties. Therefore the application of conventional NR engine mounts does not meet todays requirements. On account of the non-availability of alternatives, car producers are forced to use an unsatisfactory product.

In order to solve the problem of the car industry, the rubber composition of the present invention was developed which is heat stable and provides the necessary physical and dynamic properties. EPDM was selected due to it excellent heat aging resistance. However, EPDM has rather poor elasticity. Therefore, the conventional carbon black filler must be replaced by silica. But silica alone dose not impart the necessary performance. Only the combination with organosilances of the described types lead to the industry's requested compound properties. The silica which is suitable for this application must be in the BET-surface area range of 50–100 $m^2/g$. Silica with higher surface area exhibit less elasticity and higher compression set, while silica with lower surface area do not achieve the requested balance of overall properties. The rubber compositon of the present invention enables producers of engine mounts for cars to deliver products to the car industry which are unexpectedly superior to the conventional products. It enables the car industry to design cars with better aerodynamic properties, resulting in lower gasoline consumption which is also a benefit to the environment.

In the following, the present invention is explained with reference to working examples, but it is to be noted that the present invention is not restricted by these working examples.

Examples

The evaluation test methods (known in the art) for the vulcanized sheets in the Examples and Comparative Examples are as follows:

(1) Tensile Test. A vulcanized rubber sheet was punched to obtain a No. 3 type dumbbell specimen described in JIS K 6301 (1989), and using the thus obtained specimen, a tensile test was effected according to the method defined in Item 3 of the above JIS K 6301 at a measuring temperature of 25° C., and at a tensile speed of 500 mm/min, whereupon 25% modulus ($M_{25}$), 50% modulus ($M_{50}$), 100% modulus ($M_{100}$), 200% modulus ($M_{200}$), and 300% modulus ($M_{300}$), tensile breaking point stress TB (kgf/cm2) and tensile breaking point elongation $E_B$ (%) were determined.

(2) Hardness Test. As hardness test, there was determined a spring hardness $H_S$ (JIS A hardness) according to JIS K 6301 (1989).

(3) Extension Fatigue Test (Monsanto Fatigue Test). A vulcanized rubber sheet was punched to obtain a No. 3 type dumbbell specimen described in JIS K 6301, and 20 of the thus obtained specimens were subjected to extension fatigue, respectively, under the conditions of an extension ratio of 200%, a measurement temperature of 25° C. and a rotating speed of 300 rpm, whereupon the average number of the times of the test before dumbbell breaking was used as an index of dynamic fatigue resistance (durability).

(4) Heat Aging Resistance Test. As heat aging resistance test, a vulcanized rubber sheet was subjected to air heat aging according to JIS K 6301 (1989), whereupon the tensile strength, elongation and tensile stress of the sheet after aging were measured and the heat aging resistance of the sheet was indicated by the retention (%) of these properties based on the original ones of the unaged sheet.

(5) Elongation Set Test (PSM). Elongation set test was conducted such that a No. 1 type dumbbell specimen was obtained according to JIS K 6301, and the obtained specimen to be measured was stretched to a proportion of 200% and then retained for 10 minutes, whereafter the specimen was allowed to shrink and 10 minutes later a measurement of elongation set was conducted.

(6) Evaluation of Dynamic Properties (Tan δ). Dynamic property test was conducted according to JIS K 6394, using a visco-elasticity testing machine manufactured by Rheometrics Co. Ltd. (type : RDS-2), at measurement temperatures of 25° C. and 80° C., a frequency of 10 Hz and a distortion factor of 1%, so that tan δ was obtained.

(7) Compressive Permanent Strain Test. Compressive permanent strain test was conducted according to JIS K 6301 (1989), and the compressive permanent distortion factor (%) of a vulcanized sheet was obtained.

In addition, the ethylene-propylene-5-ethylidiene-2-norbornene copolymer rubber, alkoxysilane compound and amorphous silica powder used in the Examples and Comparative Examples are as follows.

(1) ethylene-propylene-5-ethylidene-2-norbornene copolymer rubber

TABLE 1

|  | EPT-1 | EPT-2 | EPT-3 |
| --- | --- | --- | --- |
| Ethylene content (mol %) | 70 | 71 | 70 |
| iodine value (ENB) | 18 | 20 | 19 |
| $MS_{1+4}$ (160° C.) | 70 | 20 | 45 |

(2) Alkoxysilane compound (silane coupling agent)

($H_5C_2O$)$_3$Si—($CH_2$)$_3$—$S_4$—($CH_2$)$_3$–Si$C_2H_5$)$_3$ . . . produced by Degussa AG, Si-69

(3) Amorphous silica powder

TABLE 2

|  | Silica-1 | Silica-2 |
| --- | --- | --- |
| Name of product | DUROSIL (*1) | VN3 (*2) |
| Specific surface area (m²/g) (BET) | 50 | 170 |
| pH | 9 | 6.3 |
| Oil absorption of DBP (g/100 g) | 220 | 270 |
| Average size of aggregates (μm) | 4.5 | 15 |

(*1): produced by Degussa AG
(*2): produced by Degussa AG

Comparative Example 1

100 parts by weight of EPT-1 shown in Table 1, 60 parts by weight of paraffinic oil ("Sansen 4240" produced by Sanshin Kagaku K. K.), 5 parts by weight of zinc white No. 1, 1 part by weight of stearic acid, and 60 parts by weight of FEF carbon black ("Asahi 60 HG" produced by Asahi Carbon K. K.) were kneaded with a 4.3 l Banburry mixer (produced by Kobe Seikosho K. K.).

After the thus obtained kneaded substance had been cooled to a temperature of about 50° C., there were added to the kneaded substance 1.5 part by weight of sulfur, 1.0 part by weight of "Noceller M" (MBT, 2-mercaptobenzothiazole, produced by Ouchi Shinko Kagaku Kogyo K. K., vulcanization promotor), 0.8 part by weight of "Noceller TRA" (dipentamethylenethiuram tetrasulfide, produced by Ouchi Shinko Kagaku Kogyo K. K., vulcanization promotor), 1.5 part by weight of "Noceller BZ" (ZnBDC, zinc dibutyldithiocarbamate, produced by Ouchi Shinko Kagaku Kogyo K. K., vulcanization promotor), and 0.8 part by weight of "Noceller TT" (TMTD, tetramethylthiuram disulfide, produced by Ouchi Shinko Kagaku Kogyo K. K., vulcanization promotor), and the obtained mixture was kneaded by 8 inch rolls (temperature of front and rear rolls: 55° C.), and the thus kneaded substance was gaged into a sheet-like state, whereafter the thus gaged substance was pressed for 20 minutes at a temperature of 150° C. to obtain a vulcanized sheet with a thickness of 2 mm. Physical properties of the thus obtained vulcanized sheet were evaluated according to the above methods.

In addition, the above pressing was conducted for 22 minutes at a temperature of 150° C., whereby there was obtained a thick vulcanized rubber molded body for compressive permanent strain test, and the thus obtained thick vulcanized rubber molded body was subjected to compressive permanent strain test. The results are set forth in Table 3.

Example 1

The procedures of Comparative Example 1 were followed with the exception that the amount of the blended FEF carbon black in Comparative Example 1 was changed to 40 parts by weight, and that Silica-1 shown in Table 2 and the above alkoxysilane compound were used in amounts of 20 parts by weight and 1 part by weight, respectively, whereby a vulcanized sheet was obtained. The physical properties of the thus obtained vulcanized sheet were evaluated. The results are set forth in Table 3.

Example 2

The procedures of Comparative Example 1 were followed with the exception that the amount of the blended FEF carbon black in Comparative Example 1 was changed to 20 parts by weight, and that Silica-1 shown in the above Table 2 and the above alkoxysilane compound were used in amounts of 40 parts by weight and 2 parts by weight, respectively, whereby a vulcanized sheet was obtained. The physical properties of the thus obtained vulcanized sheet were evaluated. The results are set forth in Table 3.

Example 3

The procedures of Comparative Example 1 were followed with the exception that the amount of the blended FEF carbon black in Comparative Example 1 was changed to 60 parts by weight, and that Silica-1 shown in the above Table 2 and the above alkoxysilane compound were used in amounts of 60 parts by weight and 3 parts by weight, respectively, whereby a vulcanized sheet was obtained. The physical properties of the thus obtained vulcanized sheet were evaluated. The results are set forth in Table 3.

Example 4

The procedures of Example 3 were followed with the exception that EPT-3 shown in the above Table 1 was used instead of EPT-1, whereby a vulcanized sheet was obtained. The physical properties of the thus obtained vulcanized sheet were evaluated. The results are set forth in Table 3.

Comparative Example 2

The procedures of Comparative Example 1 were followed with the exception that the amount of the blended FEF carbon black in Comparative Example 1 was changed to 40 parts by weight, and that Silica-2 shown in the above Table 2 and the above alkoxysilane compound were used in amounts of 20 parts by weight and 3 parts by weight, respectively, whereby a vulcanized sheet was obtained. The physical properties of the thus obtained vulcanized sheet were evaluated. The results are set forth in Table 3.

Comparative Example 3

The procedures of Comparative Example 1 were followed with the exception that the amount of the blended FEF carbon black in Comparative Example 1 was changed to 0 parts by weight, and that Silica-2 shown in the above Table 2 and the above alkoxysilane compound were used in amounts of 60 parts by weight and 9 parts by weight, respectively, whereby a vulcanized sheet was obtained. The physical properties of the thus obtained vulcanized sheet were evaluated. The results are set forth in Table 3.

Comparative Example 4

The procedures of Comparative Example 1 were followed with the exception that the amount of the blended FEF carbon black in Comparative Example 1 was changed to 0 part by weight, and that Silica-2 shown in the above Table 2 and the above alkoxysilane compound were used in amounts of 60 parts by weight and 6 parts by weight, respectively, whereby a vulcanized sheet was obtained. The physical properties of the thus obtained vulcanized sheet were evaluated. The results are set forth in Table 3.

Comparative Example 5

The procedures of Comparative Example 1 were followed with the exception that EPT-2 shown in Table 1 was used instead of EPT-1 in Comparative Example 1, the amount of the blended FEF carbon black in Comparative Example 1 was changed to 0 part by weight, and that Silica-1 shown in the above Table 2 and the above alkoxysilane compound were used in amounts of 60 parts by weight and 3 parts by weight, respectively, whereby a vulcanized sheet was obtained. The physical properties of the thus obtained vulcanized sheet were evaluated. The results are set forth in Table 3.

Comparative Example 6

100 parts by weight of natural rubber (RSS No. 1), 20 parts by weight of paraffinic oil ("Sansen 4240" produced by Sanshin Kagaku K. K.), 5 parts by weight of zinc white No. 1, 1 part by weight of stearic acid, and 40 parts by weight of HAF carbon black ("Asahi#70" produced by Asahi Carbon K. K.) were kneaded with a 4.3 l Banburry mixer (produced by Kobe Seikosho K. K.). After the thus obtained kneaded substance had been cooled to a temperature of about 50° C., there were added to the kneaded substance 1.5 parts by weight of sulfur and 1.0 parts by weight of "Nocceller CZ" (produced by Ouchi Shinko Kagaku Kogyo K. K., vulcanization promotor), and the obtained mixture was kneaded with 8 inch rolls (temperature of front and rear rolls: 55° C.), and the thus kneaded substance was gaged into a sheet-like state, whereafter the thus gaged substance was pressed for 13 minutes at a temperature of 150° C. to obtain a vulcanized sheet with a thickness of 2 mm. Physical properties of the thus obtained vulcanized sheet were evaluated according to the above methods. The results are set forth in Table 3.

TABLE 3

|  | Comparative Example | Example | | | |
| --- | --- | --- | --- | --- | --- |
|  | 1 | 1 | 2 | 3 | 4 |
| EPT-1 | 100 | 100 | 100 | 100 | — |
| EPT-3 | — | — | — | — | 100 |
| paraffinic oil | 60 | 60 | 60 | 60 | 60 |
| zinc white No. 1 | 5 | 5 | 5 | 5 | 5 |
| stearic acid | 1 | 1 | 1 | 1 | 1 |
| FEF carbon black | 60 | 40 | 20 | 0 | 0 |
| Silica-1 | 0 | 20 | 40 | 60 | 60 |
| Si-69 | 0 | 1 | 2 | 3 | 3 |
| vulcanization promotor |  |  |  |  |  |
| Nocceler-M | 1.0 | 1.0 | 1.0 | 1.0 | 1.0 |
| Nocceler-TRA | 0.8 | 0.8 | 0.8 | 0.8 | 0.8 |
| Nocceler-BZ | 1.5 | 1.5 | 1.5 | 1.5 | 1.5 |
| Nocceler-TT | 0.8 | 0.8 | 0.8 | 0.8 | 0.8 |

TABLE 3-continued

| | | | | | |
|---|---|---|---|---|---|
| sulfur | 1.5 | 1.5 | 1.5 | 1.5 | 1.5 |
| Physical Properties of Vulcanized Rubber | | | | | |
| $M_{25}$ (kgf/cm$^2$) | 6 | 6 | 6 | 5 | 5 |
| $M_{50}$ (kgf/cm$^2$) | 8 | 9 | 8 | 8 | 8 |
| $M_{100}$ (kgf/cm$^2$) | 14 | 14 | 14 | 13 | 13 |
| $M_{200}$ (kgf/cm$^2$) | 33 | 36 | 33 | 33 | 34 |
| $M_{300}$ (kgf/cm$^2$) | 57 | 62 | 60 | 64 | 65 |
| $T_B$ (kgf/cm$^2$) | 200 | 195 | 198 | 190 | 184 |
| $E_B$ (%) | 650 | 600 | 630 | 600 | 590 |
| $H_S$ (JIS A) | 51 | 50 | 49 | 48 | 48 |
| Elongation set (200%) | 4 | 3 | 3 | 2 | 3 |
| Compressive permanent strain (%) | 38 | 37 | 36 | 35 | 38 |
| Heat aging resistance | | | | | |
| $A_R$ ($T_B$) (%) | 93 | 94 | 95 | 96 | 95 |
| $A_R$ ($E_B$) (%) | 52 | 58 | 65 | 70 | 68 |
| $A_H$ (JIS A) | +5 | +4 | +4 | +4 | +4 |
| Tan δ (× 10$^{-2}$) | | | | | |
| at 25° C. | 9.22 | 7.93 | 6.54 | 5.85 | 6.02 |
| at 80° C. | 6.99 | 5.02 | 3.99 | 3.14 | 3.24 |
| Extension fatigue test (average number of times before break) | 7,500 | 10,400 | 12,200 | 14,500 | 8,900 |

| | Comparative Example | Comparative Example | | | |
|---|---|---|---|---|---|
| | 2 | 3 | 4 | 5 | 6 |
| EPT-1 | 100 | 100 | 100 | 0 | *1 |
| EPT-2 | 0 | 0 | 0 | 100 | |
| paraffinic oil | 60 | 60 | 60 | 60 | |
| zinc white No. 1 | 5 | 5 | 5 | 5 | |
| stearic acid | 1 | 1 | 1 | 1 | |
| FEF carbon black | 40 | 20 | 0 | 0 | |
| Silica-2 | 20 | 40 | 60 | 0 | |
| Silica-1 | 0 | 0 | 0 | 60 | |
| Si-69 | 3 | 6 | 9 | 3 | |
| Physical Properties of Vulcanized Rubber | | | | | |
| $M_{25}$ (kgf/cm$^2$) | 6 | 6 | 6 | 6 | 4 |
| $M_{50}$ (kgf/cm$^2$) | 8 | 8 | 8 | 8 | 6 |
| $M_{100}$ (kgf/cm$^2$) | 14 | 15 | 15 | 14 | 10 |
| $M_{200}$ (kgf/cm$^2$) | 34 | 33 | 32 | 30 | 27 |
| $M_{300}$ (kgf/cm$^2$) | 58 | 56 | 56 | 50 | 57 |
| $T_B$ (kgf/cm$^2$) | 205 | 195 | 185 | 195 | 227 |
| $E_B$ (%) | 640 | 630 | 620 | 600 | 640 |
| $H_S$ (JIS A) | 50 | 50 | 50 | 50 | 40 |
| Heat aging resistance | | | | | |
| $A_R$ ($T_B$) (%) | 90 | 91 | 94 | 92 | 12 |
| $A_R$ ($E_B$) (%) | 50 | 53 | 51 | 56 | *2 |
| $A_H$ (JIS A) | +4 | +3 | +3 | +3 | +21 |
| tan δ (× 10$^{-2}$) | | | | | |
| at 25° C. | 9.12 | 9.11 | 9.02 | 6.23 | 5.91 |
| at 80° | 6.84 | 6.85 | 7.02 | 4.42 | 3.21 |
| Extension fatigue test (average number of times before break) | 7,100 | 6,500 | 6,800 | 5,500 | 12,000 |

*1: Natural rubber was used instead of EPT.
*2: The value was too low to be determined.
*3: The vulcanization promoters and sulfur in comparative examples 2 to 5 were the same as those of comparative example 1.

As is apparent from the comparison of examples 1 to 3 with comparative example 1 in the above Table 3, by combining the amorphous silica powder and the alkoxysilane compound (silane coupling agent) of the present invention, the tan δ value may be unexpectedly lowered, i.e. the dynamic properties may be improved. Although the improvement of the dynamic properties (lowering of tan δ) and that of fatigue resistance are generally in an antinomic relationship with each other, fatigue resistance is unexpectedly improved, and dynamic properties are also unexpectedly improved by increasing the amount of amorphous silica powder treated with a silane coupling agent.

In addition, as apparent from the comparison of examples 1 to 3 with comparative examples 2 to 4 in Table 3, even if the EPT-1 and SI-69 (silane coupling agent) used in examples 1 to 3 are used, the dynamic properties cannot be improved when the specific surface area of the amorphous silica powder exceeds 100 m²/g.

Further, as apparent from the comparison of examples 1 to 3, and comparative examples 5 to 6 in the above Table 3, in order to obtain a fatigue resistance equal to that of natural rubber, a diene rubber in comparative example 6, the Mooney viscosity $MS_{1+4}$ (160° C.) of EPT should be 40 or more.

Furthermore, as apparent from the comparison of example 3 with comparative example 6 in the above Table 3, the vulcanized rubber in example 3 is unexpectedly more excellent in heat resistance than the vulcanized rubber of the natural rubber, the diene rubber in comparative example 6, and has fatigue resistance and dynamic properties unexpectedly equal to those of the vulcanized rubber of natural rubber.

Further examples illustrate the improvements of dynamic properties when reducing the filler content and the plasticizer content.

The following standard test methods are used:
(1) 100% Modulus according to DIN 53 504
(2) Resilience according to DIN 53 512
(3) Shore A Hardness according to DIN 53 505
(4) Loss factor tan δ according to DIN 53 513
(5) Complex dynamic according to DIN 53 513 modulus The ingredients are used as follows:
Ethylene-propylene-diene rubber (Buna)

|  | AP 341 | AP 451 |
|---|---|---|
| Ethylene content (%) | 50 | 50 |
| Diene content (%) | 4 | 8 |
| Iodine value | 8 | 14 |
| Mooney viscosity (100° C.) (DIN 53523/53524) | 70 | 90 |

Further ingredients:

| Ingraplast ® NS | naphtenic plasticizer |
|---|---|
| Vulkacit ® Merkapto | 2-mercapto-benzothiazol |
| Vulkacit ® Thiuram | tetramethylthiuramdi-sulfide |
| Si 69 | bis (3-triethoxysilylpropyl) tetrasulfane |
| CORAX ® N 550 | furnace black manufactured by Degussa AG (41 m²/g) |
| Durosil ® | precipitated silica manufactured by Degussa AG (BET-surface 50 m²/g) |

|  | Comparative Examples | | | |
|---|---|---|---|---|
| Recipe | A | B | C | D |
| Buna AP 341 | 100 | — | 100 | — |
| Buna AP 451 | — | 100 | — | 100 |
| Stearic acid | 1 | 1 | 1 | 1 |
| Zinc oxide RS | 5 | 5 | 5 | 5 |
| Ingraplast NS | 60 | 60 | 33 | 33 |
| CORAX N 550 | 60 | 60 | 5 | 5 |
| Durosil | — | — | 40 | 40 |
| Si 69 | — | — | 2 | 2 |
| Vulkacit Merkapto | 0.5 | 0.5 | 0.5 | 0.5 |
| Vulkacit Thiuram | 3 | 3 | 3 | 3 |
| Sulfur | 1.5 | 1.5 | 1.5 | 2 |

Physical properties of vulcanized rubber

|  | Comparative Examples | | | |
|---|---|---|---|---|
| Cure temperature: 150° C. | A | B | C | D |
| 100% Modulus (MPa) | 2.6 | 2.8 | 2.9 | 3.5 |
| Resilience (%) | 60 | 61 | 69 | 68 |
| Shore A hardness | 62 | 61 | 62 | 64 |

Viscoelastic properties

| test equipment: | MTS 831 |
|---|---|
| sample used: | cylinders 10 × 10 mm, cured at 150° C. to t95% |
| pre-load: | 50 N |
| stress aptitude: | ±25 N |
| running time: | 2 min. |

| No. | Test Temperature ° C. | Test Frequency Hz | Complex Modulus E MPa | Loss factor tan δ |
|---|---|---|---|---|
| A | 23 | 1 | 5.6 | 0.041 |
|  |  | 5 | 7.0 | 0.116 |
|  |  | 10 | 7.1 | 0.119 |
|  |  | 20 | 7.4 | 0.122 |
|  |  | 30 | 7.4 | 0.124 |
|  |  | 40 | 7.5 | 0.122 |
| B | 23 | 1 | 5.8 | 0.041 |
|  |  | 5 | 7.0 | 0.100 |
|  |  | 10 | 7.1 | 0.106 |
|  |  | 20 | 7.4 | 0.107 |
|  |  | 30 | 7.4 | 0.110 |
|  |  | 40 | 7.4 | 0.109 |
| C | 23 | 1 | 6.2 | 0.019 |
|  |  | 5 | 7.2 | 0.059 |
|  |  | 10 | 7.3 | 0.064 |
|  |  | 20 | 7.6 | 0.067 |
|  |  | 30 | 7.5 | 0.068 |
|  |  | 40 | 7.6 | 0.066 |
| D | 23 | 1 | 6.7 | 0.015 |
|  |  | 5 | 7.6 | 0.053 |
|  |  | 10 | 7.7 | 0.058 |
|  |  | 20 | 7.9 | 0.060 |
|  |  | 30 | 7.9 | 0.061 |
|  |  | 40 | 8.1 | 0.062 |
| A | 60 | 1 | 5.7 | 0.035 |
|  |  | 5 | 6.6 | 0.075 |
|  |  | 10 | 6.8 | 0.077 |
|  |  | 20 | 6.8 | 0.081 |
|  |  | 30 | 7.0 | 0.083 |
|  |  | 40 | 6.9 | 0.083 |
| B | 60 | 1 | 6.0 | 0.023 |
|  |  | 5 | 6.9 | 0.061 |
|  |  | 10 | 7.0 | 0.062 |
|  |  | 20 | 7.2 | 0.066 |
|  |  | 30 | 7.2 | 0.067 |

-continued

| No. | Test Temperature ° C. | Test Frequency Hz | Complex Modulus E MPa | Loss factor tan δ |
|---|---|---|---|---|
|   |    | 40 | 7.3 | 0.068 |
| C | 60 | 1  | 7.0 | 0.010 |
|   |    | 5  | 7.8 | 0.033 |
|   |    | 10 | 7.8 | 0.035 |
|   |    | 20 | 8.0 | 0.034 |
|   |    | 30 | 8.0 | 0.037 |
|   |    | 40 | 8.2 | 0.036 |
| D | 60 | 1  | 7.5 | 0.013 |
|   |    | 5  | 8.3 | 0.030 |
|   |    | 10 | 8.4 | 0.032 |
|   |    | 20 | 8.5 | 0.032 |
|   |    | 30 | 8.4 | 0.031 |
|   |    | 40 | 8.6 | 0.030 |

The comparison between the examples A, B, C and D shows that the replacement of carbon black by Durosil in combination with a silane unexpectedly leads to a drastic reduction in tan δ and, correspondingly, to increased resilience, while modulus and shore hardness remain constant.

Comparative Examples 7–9

The procedures of Example 1 were followed with the exception that amorphous silica powder VN2 shown in the following Table 4 was used instead of Silica-I in amount shown in Table 5 and alkoxysilane compound Si-69 was used in an amount shown in Table 5, whereby a vulcanized sheet was obtained.

The physical properties of the thus obtained vulcanized sheet were evaluated.

The results are set forth in Table 5.

TABLE 4

|   | VN2* |
|---|---|
| Specific surface area [m²/g] | 125 |
| pH | 6.9 |

*produced by Degussa AG

TABLE 5

|   | Comparative Examples | | |
|---|---|---|---|
|   | 7 | 8 | 9 |
| EPT-1 | 100 | 100 | 100 |
| Paraffinic oil | 60 | 60 | 60 |
| Zinc White No. 1 | 5 | 5 | 5 |
| Stearic acid | 1 | 1 | 1 |
| FEF Carbon black | 40 | 20 | 0 |
| VN2 | 20 | 40 | 60 |
| Si-69 | 3 | 6 | 9 |
| Physical Properties of Vulcanized Rubber | | | |
| M$_{25}$ [Kgf/cm²] | 6 | 6 | 6 |
| M$_{50}$ [Kgf/cm²] | 8 | 8 | 8 |
| M$_{100}$ [Kgf/cm²] | 14 | 14 | 14 |
| M$_{200}$ [Kgf/cm²] | 35 | 34 | 33 |
| M$_{300}$ [Kgf/cm²] | 59 | 56 | 57 |
| T$_B$ [Kgf/cm²] | 201 | 191 | 179 |
| E$_B$ [%] | 630 | 610 | 600 |
| H$_S$ (JISA) | 50 | 50 | 50 |

TABLE 5-continued

|   | Comparative Examples | | |
|---|---|---|---|
|   | 7 | 8 | 9 |
| Heat aging resistance | | | |
| A$_R$ (T$_B$) [%] | 89 | 90 | 93 |
| A$_R$ (E$_B$) [%] | 49 | 52 | 52 |
| A$_H$ (JISA) | +3 | +3 | +3 |
| tan δ [×10⁻²] | | | |
| at 25° C. | 9.10 | 9.10 | 9.08 |
| at 80° C. | 6.91 | 6.75 | 7.05 |
| Extension Fatigue Test [average number of times before break] | 6,900 | 6,300 | 6,400 |

Vulcanization promotors and sulfur used in Comparative Examples 7–9 were the same as those of Example 1.

As is apparent from the Compartive Examples 7–9, the dynamic properties cannot be improved when the specific surface area of the silica powder incorporated into the vulcanizable rubber composition exceeds 100 m²/g.

In another comparative example, a rubber composition containing Durosil having a BET specific surface area of 50 m²/g was compared to a rubber compositon containing Extrusil ( a precipitated silica manufactured by Degussa AG (BET-surface 35 m²/g)):

| MIXING PROCEDURE | | | |
|---|---|---|---|
| Stage: 1 | | | |
| Mixer: | | Cooling Medium Temp. | 70° C. |
| Friction Ratio | 1:1.11 | Initial Chamber Temp. | 50–80° C. |
| Faster Rotor rpm | 60 | | |
| Ram Pressure | 5.5 bar | Stipulated Max. Batch Temp. | 160° C. |
| Empty Volume | 1.6 | | |
| Fill Factor | 0.9 | | |
|   | 0–1' | filler | |
|   |   | ZnO active, stearic acid Si 69 | |
|   | 1' | clean | |
|   | 1–3.5' | mix | |
|   | 3.5 | roll up | |
| Batch Temperature | 160° C. | | |
| Standing Time of the Premix | 24h/RT | | |
| Stage: 2 | | | |
| Mixer: | | Cooling Medium Temp. | 50° C. |
| Friction Ratio | 1:1.11 | Initial Chamber Temp. | 30–60° C. |
| Faster Rotor rpm | 50 | | |
| Ram Pressure | 5.5 bar | Stipulated Max. Batch Temp. | 110° C. |
| Empty Volume | 1.6 | | |
| Fill Factor | 0.88 | | |
|   | 0–1' | batch step 1 | |
|   | 1–1.5' | sulfur | |
|   | 1.5–2.5' | accelerator | |
|   | 2.5' | roll up and pass 3x through a wide and 3x through a tight nip, sheet out | |
| Batch Temperature | 110° C. | | |

Comparison test: "Extrusil - Durosil" in EPDM (Ethylene propylene diene monomer)

| COMPOSITION: | | |
|---|---|---|
| Buna AP 451 | 100 | 100 |
| Stearic acid | 1 | 1 |
| ZnO active | 5 | 5 |
| Ingraplast NS | 60 | 60 |
| Durosil | 60 | — |
| Extrusil (35m²/g) | — | 60 |

-continued

| | | |
|---|---|---|
| Si 69 | 3 | 2 |
| Vulkacit Mercapto | 0.5 | 0.5 |
| Vulkacit Thiuram | 3 | 3 |
| Sulfur | 2 | 2 |
| Vulcanization temperature | 160° C. | |
| Vulcanization time | 60 minutes | |
| MEASUREMENTS: | | |
| Tensile stress | 7.2 | 5.2 |
| 50% modulus (MPa) | 1.3 | 1.0 |
| 100% modulus (MPa) | 2.7 | 2.0 |
| 200% modulus (MPa) | 7.1 | 4.8 |
| Energy at break (J) | 1.9 | 1.4 |
| Shore A hardness | 57 | 54 |

Thus, the rubber composition containing Durosil (BET specific surface area of 50 m²/g) is clearly superior to the rubber composition containing Extrusil (BET specific surface area of 35 m²/g)

Further variations and modifications of the foregoing will be apparent to those skilled in the art and such variations and modifications are attended to be encompassed by the claims that are appended hereto.

German Priority Application P 41 41 975.8, filed on Dec. 19, 1991, is relied on and incorporated by reference.

What is claimed:

1. A vulcanizable rubber composition, comprising:
   (a) an ethylene-propylene-nonconjugated diene copolymer rubber (EPDM) having a Mooney viscosity ($MS_{1+4}$, 160° C.) of 40 to 80, wherein the diene is selected from the group consisting of 1,4-hexadiene; 1,6-octadiene; 2-methyl-1,4-hexadiene; 6-methyl-1,5-heptadiene; 7-methyl-1,6-octadiene; cyclohexadiene; dicylopentadiene; methylterahydroindene; 5-vinylnorbornene; 5-ethylidene-2-norbornene; 5-methylene-2-norbornene; 5-isopropylidene-2-norbornene; 6-chlormethyl-5-isopropenyl-2-norborene; 2,3-diisopropylidene-5-norbornene; 2-ethylidene-3-isopropylidene-5-norbornene; and 2-propenyl-2,2-norbornadiene; and a sufficient amount of a cross-linking system capable of crossing the rubber;
   (b) at least one of the alkoxysilane compounds selected from the group consisting of bis-3-(trimethoxysilyl) propyl-tetrasulfane; bis-3-(triethoxysilyl)propyl-tetrasulfane; bis-3-(tripropoxysiliyl)propyl-tetrasulfane; and 3-Butene-triethoxysilane;
   (c) silica and/or silicate powder having a BET specific surface area of 50 to 100 m²/g; and
   (d) carbon black with a specific surface area ranging between 5 to 90m²/g in an amount of 0.1 to 60 parts by weight, and/or a mineral filler with a specific surface area ranging between 1 and 30m²/g in an amount of 0.1 to 100 parts by weight.

2. A vulcanizable rubber composition, comprising:
   (a) an ethylene-propylene-nonconjugated diene copolymer rubber (EPDM);
   (b) an alkoxysilane compounds according to formula (I); and
   (c) silica and/or silicate powder;
wherein formula I is as follows:

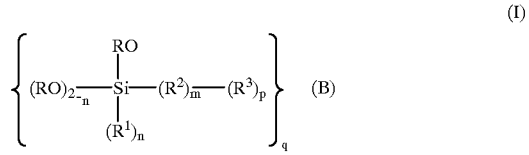

(I)

wherein

R is an alkyl group having 1 to 4 carbon atoms, or an alkoxy group having 1 to 4 carbon atoms;

$R^1$ is an alkyl group having 1 to 4 carbon atoms or is a phenyl group;

n is 0, 1 or 2;

$R^2$ is a divalent saturated straight-chained or branched hydrocarbon radical having 1 to 6 carbon atoms;

$R^3$ is an arylene group having 6 to 12 carbon atoms;

m is 0 or 1;

p is 1;

q is 1 or 2; and

B is —SCN or SH when q is 1, or B is —Sx- when q is 2, where x is an integer of from 2 to 8.

* * * * *